United States Patent
Shiung et al.

(10) Patent No.: US 9,350,906 B2
(45) Date of Patent: *May 24, 2016

(54) ENCAPSULANT MODULE WITH OPAQUE COATING

(75) Inventors: Shin-Chang Shiung, Taichung (TW); Chieh-Yuan Cheng, Hsinchu (TW); San-Yuan Chung, Hsinchu (TW)

(73) Assignees: OMNIVISION TECHNOLOGIES, INC., Santa Clara, CA (US); VISERA TECHNOLOGIES COMPANY LIMITED, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/465,092

(22) Filed: May 13, 2009

(65) Prior Publication Data

US 2010/0085473 A1    Apr. 8, 2010

Related U.S. Application Data

(63) Continuation-in-part of application No. 12/244,431, filed on Oct. 2, 2008.

(51) Int. Cl.
*H04N 5/225* (2006.01)
*G03B 19/00* (2006.01)

(52) U.S. Cl.
CPC .............. *H04N 5/2254* (2013.01); *G03B 19/00* (2013.01)

(58) Field of Classification Search
USPC ............ 348/340, 335, 374, 75; 257/678, 644, 257/91, 98, 749, 666
See application file for complete search history.

(56) References Cited

U.S. PATENT DOCUMENTS

| | | | |
|---|---|---|---|
| 4,896,217 A * | 1/1990 | Miyazawa et al. | 348/340 |
| 5,673,083 A | 9/1997 | Izumi et al. | |
| 7,609,962 B2 * | 10/2009 | Chen | 396/535 |
| 2002/0109773 A1 * | 8/2002 | Kuriyama et al. | 348/36 |
| 2004/0095502 A1 * | 5/2004 | Losehand et al. | 348/340 |
| 2005/0195313 A1 * | 9/2005 | Tsuji et al. | 348/362 |
| 2006/0181633 A1 * | 8/2006 | Seo | 348/340 |
| 2006/0280500 A1 | 12/2006 | Chen | |
| 2007/0113441 A1 * | 5/2007 | Slowski | 40/550 |
| 2007/0236596 A1 * | 10/2007 | Sekine et al. | 348/340 |
| 2007/0242152 A1 * | 10/2007 | Chen | 348/345 |
| 2008/0073734 A1 | 3/2008 | Kong | |
| 2008/0252771 A1 * | 10/2008 | Wu | 348/340 |
| 2008/0296715 A1 | 12/2008 | Kumata et al. | |
| 2009/0079863 A1 * | 3/2009 | Aoki et al. | 348/374 |

FOREIGN PATENT DOCUMENTS

| | | |
|---|---|---|
| CN | 1979243 | 6/2007 |
| JP | 56-103475 A | 8/1981 |
| JP | H 05-121709 A | 5/1993 |
| JP | 2004-029590 | 1/2004 |
| JP | 2004-120615 A | 4/2004 |

OTHER PUBLICATIONS

Office Action with search report of corresponding TW application No. 098131194 issued on Oct. 28, 2014.

* cited by examiner

*Primary Examiner* — Roberto Velez
*Assistant Examiner* — Stephen Coleman
(74) *Attorney, Agent, or Firm* — Muncy, Geissler, Olds & Lowe, P.C.

(57) ABSTRACT

The invention provides an encapsulant module for an image sensor device. The module includes an outer frame, a set of optical elements, and an opaque coating. The outer frame includes an enclosing wall and a first opening surrounded by the enclosing wall. The set of optical elements connects to and is disposed in the enclosing wall. The opaque coating overlies the enclosing wall.

21 Claims, 4 Drawing Sheets

ENCAPSULANT MODULE WITH OPAQUE COATING

CROSS REFERENCE TO RELATED APPLICATIONS

This application is a Continuation-In-Part of pending U.S. patent application Ser. No. 12/244,431, filed on Oct. 2, 2008 and entitled "IMAGE SENSOR DEVICE WITH OPAQUE COATING", the entirety of which is incorporated by reference herein.

BACKGROUND OF THE INVENTION

1. Field of the Invention

The invention relates to an encapsulant module and more particularly to an encapsulant module with opaque coatings.

2. Description of the Related Art

A conventional image sensor device is typically covered by a polymeric or metallic encapsulant to prevent unwanted light incidence into the device. However, an additional assembly process is required to assemble the polymeric or metallic encapsulant to the conventional image sensor device, increasing assembly costs. Further, due to the assembly of the polymeric or metallic encapsulant, the volume of the conventional image sensor device is increased, thus limiting miniaturization of electronic products using the conventional image sensor device.

When the conventional image sensor device has an aperture, during assembly, precise alignment between the aperture and the aperture opening of the polymeric or metallic encapsulant is critical to prevent the aperture from being completely or partly covered by the polymeric or metallic encapsulant. Despite the requirement however, precise alignment between the aperture and the aperture opening of the polymeric or metallic encapsulant cannot be inspected during the front-end assembly process of the conventional image sensor device. Thus, when non-precise alignment is identified during the back-end assembly process, rework or repair is difficult or impossible, lowering assembly yields.

Thus, a novel encapsulant module for an image sensor device is required to solve the described problems.

BRIEF SUMMARY OF THE INVENTION

An embodiment of the invention provides an encapsulant module for an image sensor device. The encapsulant module includes an outer frame, a set of optical elements, and an opaque coating. The outer frame includes an enclosing wall and a first opening surrounded by the enclosing wall. The set of optical elements connects to and is disposed in the enclosing wall. The opaque coating overlies the enclosing wall.

An embodiment of the invention provides another encapsulant module for an image sensor device. The encapsulant module includes an outer frame, a set of optical elements, and an opaque coating. The outer frame includes an enclosing wall and a first opening surrounded by the enclosing wall. The set of optical elements is disposed in the enclosing wall, and includes a lens and a supporter connecting the lens to the enclosing wall. The opaque coating overlies the enclosing wall.

Further scope of the applicability of the invention will become apparent from the detailed descriptions given hereinafter. It should be understood however, that the detailed descriptions and specific examples, while indicating preferred embodiments of the invention, are given by way of illustration only, as various changes and modifications within the spirit and scope of the invention will become apparent to those skilled in the Art from the detailed descriptions.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
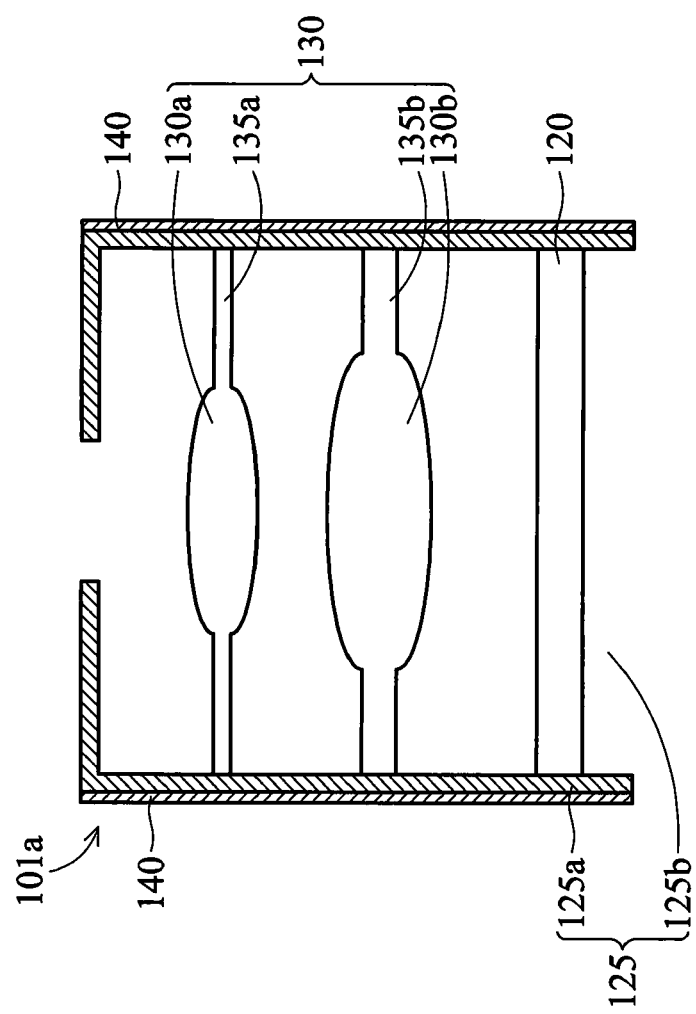
FIG. 1 shows a schematic cross-section of an image sensor device of a first embodiment of the invention.

The following description is of the best-contemplated mode of carrying out the invention. This description is made for the purpose of illustrating the general principles of the invention and should not be taken in a limiting sense. The scope of the invention is best determined by reference to the appended claims.

Next, the concepts and specific practice modes of the invention are described by the embodiments and the attached drawings. In the drawings or description, similar elements are indicated by similar reference numerals and/or letters. Further, the element shape or thickness in the drawings may be expanded for simplification or convenience of understanding. Moreover, elements which are not shown or described can be in every form known by those skilled in the art.

In the subsequent description, phrases such as "substantially the same" and etc. . . . mean expected to be the same and etc. in design, as in practice, it is difficult to be mathematically or geometrically the same and etc. Additionally, when deviation is in an acceptable range of a corresponding standard or specification, it is also recognized to be the same and etc. Those skilled in the art are expected to acknowledge, that different standards or specifications, depend upon various properties and conditions, and thus, cannot be specifically listed.

FIG. 1 is a cross section of an encapsulant module 101a of a first embodiment of the invention. Referring to FIG. 1, the encapsulant module 101a comprises an outer frame 125, a set of optical elements 130, and an opaque coating 140. The outer frame 125 comprises an enclosing wall 125a and a first opening 125b surrounded by the enclosing wall 125a, shielding the set of optical elements 130. The set of optical elements 130 connects to and is disposed in the enclosing wall 125a. The opaque coating 140 overlies the enclosing wall 125a. Therefore, when an image sensor array chip (not shown) or a package thereof is connected to the encapsulant module 101a through the first opening 125b, the opaque coating 140 functions to prevent unwanted light incidence into the image sensor devices (not shown) of the image sensor array chip.

A transparent substrate 120 is optionally disposed between the set of optical elements 130 and the first opening 125b. In a preferred embodiment, the transparent substrate 120 is a cover glass, and the footprint thereof is substantially the same as that of the set of optical elements 130. The image sensor array chip may contact the transparent substrate 120 when the image sensor array chip and the encapsulant module 101a are assembled. In this embodiment, the footprint of the first opening 125b is substantially the same as that of the transparent substrate 120 to correspond to the package size of the image sensor array chip.

In an embodiment of the invention, the opaque coating 140 is disposed overlying the outer frame 125. The opaque coating 140 can be any opaque material, such as acrylic materials, epoxy, organic polymers, and etc. formed by spraying, spin coating, dipping, tapping, or sputtering to conformally overlie the outer frame 125. Unwanted environmental light is blocked or absorbed by the opaque coating 140, and thus, image defects such as 'ghosts' resulting from unwanted light incidence into the image sensor device of the image sensor array chip assembled with the encapsulant module 101a is decreased or eliminated. As a result, no polymeric or metallic encapsulant is required by the encapsulation of the image sensor array chip, decreasing the package size thereof.

In this embodiment, the set of optical elements 130 comprises a set of convex lenses 130a and 130b connected to the enclosing wall 125a by the respective supporters 135a and 135b. In some other embodiments, the set of optical elements 130 may comprise one single lens or more than two lenses, and the lens type can be properly selected as needed. In some other embodiments, the lenses 130a and 130b may directly connect to the outer frame 125 without any supporters.

Figure 2:
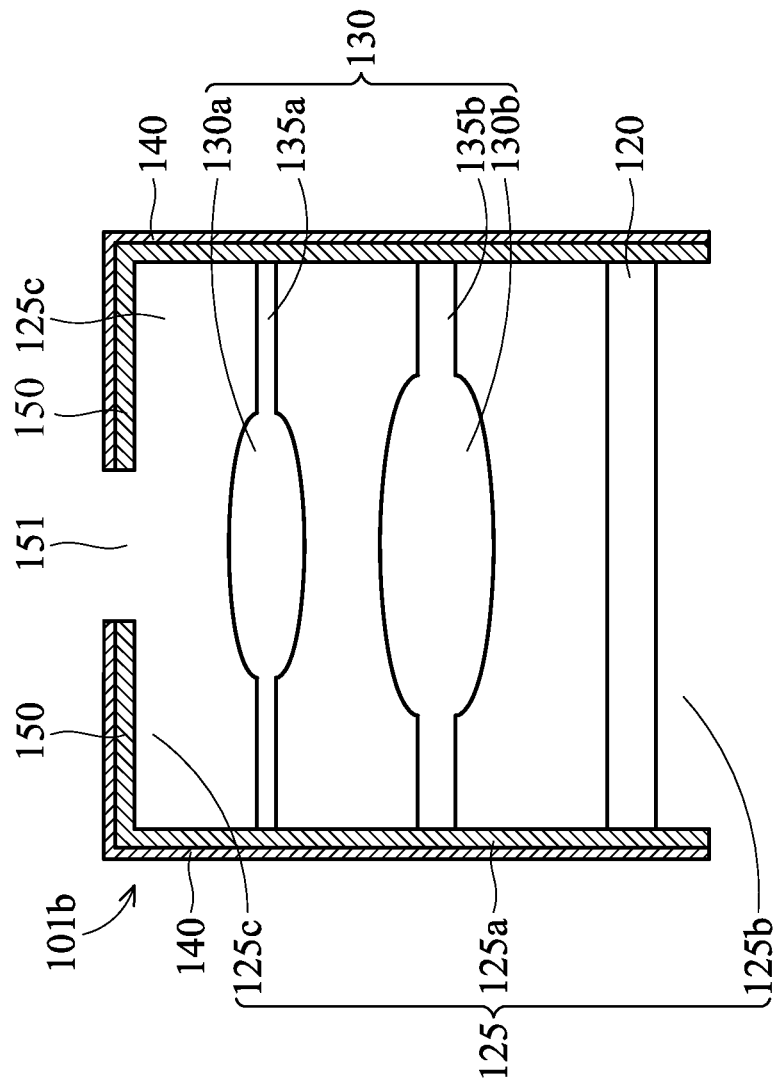
FIG. 2 shows a schematic cross-section of an image sensor device of a second embodiment of the invention.

FIG. 2 is a cross section of an encapsulant module 101b of a second embodiment of the invention. The encapsulant module 101b is nearly identical to the encapsulant module 101a of the first embodiment, and for brevity, detailed descriptions of identical portions are omitted. The encapsulant module 101b of this embodiment is different from the first embodiment in that the set of optical elements 130 further comprises a set of lenses 130a and 130b configured with an aperture module 150 comprising an aperture opening 151 exposing the set of lenses 130a and 130b. The opaque coating 140 further overlies the aperture module 150 and leaves the set of lenses 130a and 130b exposed. In this embodiment, the outer frame 125 further comprises a second opening 125c opposite to the first opening 125b and surrounded by the enclosing wall 125a, and the aperture module 150 is disposed in the second opening 125c, connected to the enclosing wall 125a.

Thus, before forming the opaque coating 140, the aperture opening 151 can be shielded or protected. An etching, lift-off, self-aligning a formation of the opaque coating 140 to the outer frame 125, or other patterning method can be performed to form the opaque coating 140 with an opening precisely aligned with the aperture opening 151. Thus, the opaque coating 140 can be precisely aligned with the outer frame 125 with an opening precisely aligned with the aperture opening 151, improving assembly yield of the image sensor array chip and the encapsulant module 101b.

Figure 3:
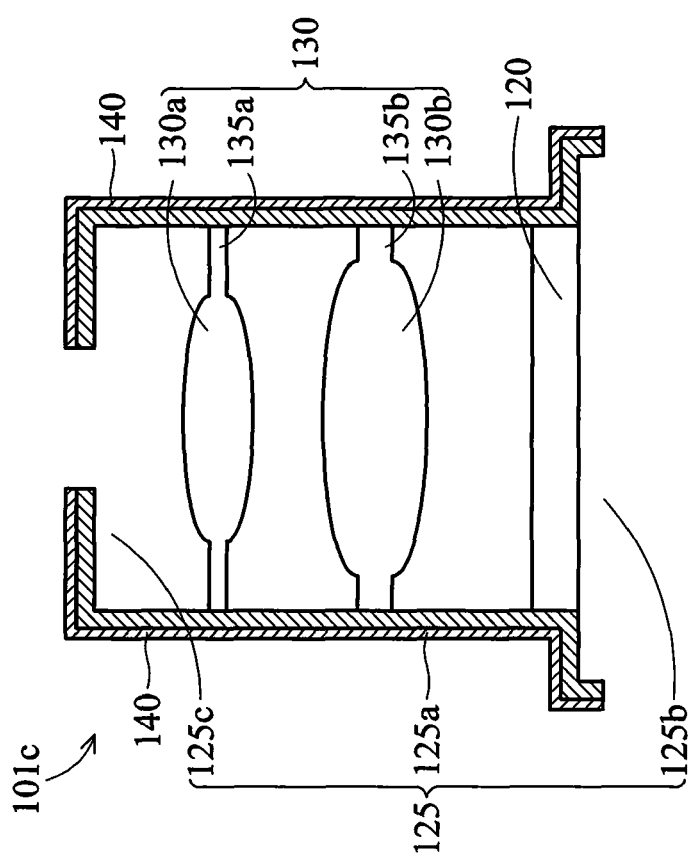
FIG. 3 shows a schematic cross-section of an image sensor device of a third embodiment of the invention.

FIG. 3 is a cross section of an encapsulant module 101c of a third embodiment of the invention. The encapsulant module 101c is nearly identical to the encapsulant module 101a of the first embodiment, and for brevity, detailed descriptions of identical portions are omitted. The encapsulant module 101c of the third embodiment is different from the first embodiment in that the footprint of the first opening 125b is larger than that of the transparent substrate 120 to correspond to the package size of the image sensor array chip. Thus, the enclosing wall 125a of the outer frame 125 and the overlying opaque coating 140 expand and extend to be able to overlie the image sensor array chip and the package thereof to prevent unwanted light incident from the larger first opening 125b. Further, the enclosing wall 125a of the outer frame 125 and the overlying opaque coating 140 preferably extends downwardly to cover side surfaces (not shown) of the package of the image sensor array chip to prevent unwanted light incident from the side surfaces.

Figure 4:
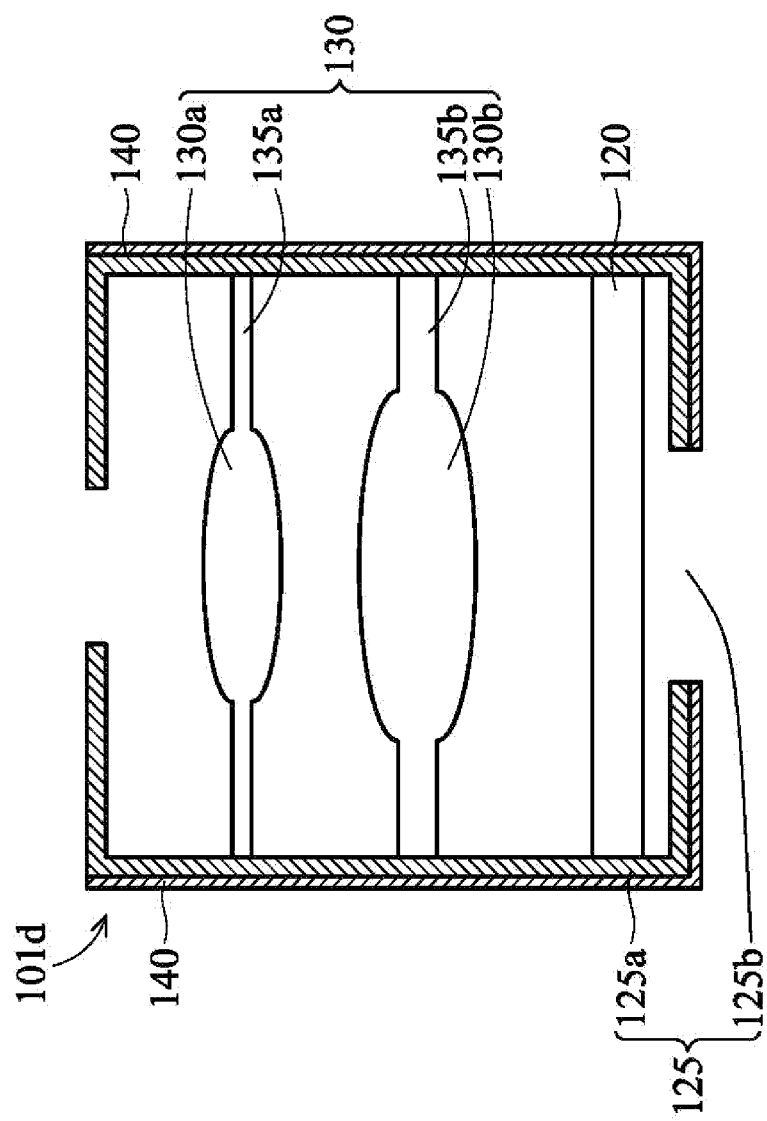
FIG. 4 shows a schematic cross-section of an image sensor device of a fourth embodiment of the invention.

FIG. 4 is a cross section of an encapsulant module 101d of a fourth embodiment of the invention. The encapsulant module 101d is nearly identical to the encapsulant module 101a of the first embodiment, and for brevity, detailed descriptions of identical portions are omitted. The encapsulant module 101d of the fourth embodiment is different from the first embodiment in that the footprint of the first opening 125b is smaller than that of the transparent substrate 120 to correspond to the package size of the image sensor array chip. The enclosing wall 125a of the outer frame 125 and the opaque coating 140 extend to be below the transparent substrate 120, leaving the smaller first opening 125b exposed. In this embodiment, the opaque coating 140 can be formed overlying the outer frame 125 before assembling the outer frame 125 and the chip of the image sensor array chip.

As described, due to the efficacy of the embodiments of the encapsulant module of the invention, prevention of unwanted light incident, decreased device size, prevention of component misalignment, and increased assembly yields may be achieved.

While the invention has been described by way of example and in terms of preferred embodiment, it is to be understood that the invention is not limited thereto. To the contrary, it is intended to cover various modifications and similar arrangements (as would be apparent to those skilled in the Art). Therefore, the scope of the appended claims should be accorded the broadest interpretation so as to encompass all such modifications and similar arrangements.

What is claimed is:

1. An encapsulant module for an image sensor device, comprising:
    an outer frame comprising an enclosing wall and a first opening open to an exterior of the encapsulant module surrounded by the enclosing wall;
    a set of lenses directly connecting to the enclosing wall and configured with an aperture module;
    an opaque coating overlying the enclosing wall and the aperture module, wherein the opaque coating comprises a coating opening aligned with an aperture opening of the aperture module such that the opaque coating shields parts of regions over the set of lenses; and
    a flat transparent substrate, between the set of lenses and the first opening, wherein the footprint of the transparent substrate is substantially the same as that of the set of lenses.

2. The module as claimed in claim 1, wherein
    the outer frame further comprises a second opening opposing to the first opening and surrounded by the enclosing wall; and
    the aperture module is disposed in the second opening, connecting to the enclosing wall.

3. The module as claimed in claim 1, wherein the opaque coating leaves the set of lenses exposed by the aperture opening.

4. The module as claimed in claim 1, wherein the footprint of the first opening is substantially the same as that of the transparent substrate.

5. The module as claimed in claim 1, wherein the opaque coating conformally overlies the outer frame and the aperture module due to spraying, spin coating, dipping, tapping, or sputtering.

6. The module as claimed in claim 1, wherein the opaque coating is an acrylic resin or epoxy resin overlying the outer frame and the aperture module.

7. The module as claimed in claim 1, wherein the set of lenses is disposed in the enclosing wall.

8. The module as claimed in claim 1, wherein the opaque coating extends to be adjacent to an edge of the aperture opening of the aperture module.

9. The module as claimed in claim 1, wherein the aperture opening is unobstructed.

10. The module as claimed in claim 1, wherein the transparent substrate is a rectangle.

11. The module as claimed in claim 1, wherein the flat transparent substrate has a top surface and a bottom surface, and
wherein an entirety of the top surface is flat and an entirety of the bottom surface is flat.

12. The module as claimed in claim 1, wherein the flat transparent substrate has a top surface and a bottom surface, and
wherein the top surface of the transparent substrate is a continuous flat surface along an entire length of the transparent substrate and the bottom surface of the transparent substrate is a continuous flat surface along an entire length of the transparent substrate.

13. The module as claimed in claim 1, wherein the first opening extends through the enclosing wall.

14. An encapsulant module for an image sensor device, comprising:
an outer frame comprising an enclosing wall and a first opening open to an exterior of the encapsulant module surrounded by the enclosing wall;
a lens connected to the enclosing wall by a supporter, wherein the lens is configured with an aperture module;
an opaque coating overlying the enclosing wall and the aperture module, wherein the opaque coating comprises a coating opening aligned with an aperture opening of the aperture module such that the opaque coating shields parts of regions over the lens; and
a flat transparent substrate, between the lens and the first opening, wherein the footprint of the transparent substrate is substantially the same as that of the lens.

15. The module as claimed in claim 14, wherein
the outer frame further comprises a second opening opposing to the first opening and surrounded by the enclosing wall; and
the aperture module is disposed in the second opening, connecting to the enclosing wall.

16. The module as claimed in claim 14, wherein the opaque coating leaves the lens exposed by the aperture opening.

17. The module as claimed in claim 14, wherein the footprint of the first opening is substantially the same as that of the transparent substrate.

18. The module as claimed in claim 14, wherein the opaque coating conformally overlies the outer frame and the aperture module due to spraying, spin coating, dipping, tapping, or sputtering.

19. The module as claimed in claim 14, wherein the opaque coating is an acrylic resin or epoxy resin overlying the outer frame and the aperture module.

20. The module as claimed in claim 14, wherein the lens is disposed in the enclosing wall.

21. A method for manufacturing an image sensor device, comprising:
providing an outer frame comprising an enclosing wall and an aperture module;
providing a set of lenses directly connecting to the enclosing wall;
overlying an opaque coating over the outer frame and the aperture module;
providing a flat transparent substrate between the set of lenses and the aperture module; and
forming an opening of the opaque coating by etching the opaque coating,
wherein the opening of the opaque coating is aligned with an opening, open to an exterior encapsulant module surrounded by the enclosing wall of the aperture module.

* * * * *